US012807272B2

(12) United States Patent
Brunault

(10) Patent No.: US 12,807,272 B2
(45) Date of Patent: Nov. 24, 2026

(54) BICYCLE CHAIN TENSIONER, KIT AND BICYCLE INCLUDING SUCH A TENSIONER

(71) Applicant: BRUNAULT R&D, Caissargues (FR)

(72) Inventor: Hugues Brunault, Caissargues (FR)

( * ) Notice: Subject to any disclaimer, the term of this patent is extended or adjusted under 35 U.S.C. 154(b) by 199 days.

(21) Appl. No.: 18/931,128

(22) Filed: Oct. 30, 2024

(65) Prior Publication Data

US 2025/0136243 A1 May 1, 2025

(51) Int. Cl.
*B62M 9/16* (2006.01)

(52) U.S. Cl.
CPC .................................... *B62M 9/16* (2013.01)

(58) Field of Classification Search
CPC ........................................................ B62M 9/16
See application file for complete search history.

(56) References Cited

U.S. PATENT DOCUMENTS

| | | | | | |
|---|---|---|---|---|---|
| 667,594 | A * | 2/1901 | Soucy, Jr. | B62K 3/005 | 280/284 |
| 3,121,575 | A * | 2/1964 | Bourgi | B62M 9/16 | 474/135 |
| 3,834,246 | A * | 9/1974 | McGilp | F16H 7/1281 | 474/135 |
| 4,036,069 | A * | 7/1977 | Clark | B62M 9/16 | 474/135 |
| 4,069,719 | A * | 1/1978 | Cancilla | B62M 9/16 | 474/134 |
| 4,909,529 | A * | 3/1990 | Maguire | B62M 9/12 | 280/261 |
| 5,054,801 | A * | 10/1991 | Maguire | B62M 9/16 | 474/56 |
| 5,221,236 | A * | 6/1993 | Raymer | B62M 9/16 | 474/134 |
| 5,667,449 | A * | 9/1997 | Dalton | B62M 9/04 | 474/70 |
| 7,059,983 | B2 * | 6/2006 | Heim | B62M 9/138 | 474/82 |
| 7,678,000 | B2 * | 3/2010 | Harnetiaux | F16H 7/1281 | 474/134 |

(Continued)

FOREIGN PATENT DOCUMENTS

| | | | |
|---|---|---|---|
| CN | 205186461 | U | 4/2016 |
| CN | 214823911 | U | 11/2021 |

(Continued)

*Primary Examiner* — Henry Y Liu
(74) *Attorney, Agent, or Firm* — Patshegen IP; Moshe Pinchas

(57) ABSTRACT

The invention relates to a bicycle chain tensioner (100), the bicycle comprising a frame, a pinion and a crown gear, a chain (150) transmitting the rotational force exerted on the crown gear by means of the crankset to the pinion (105), comprises:

a first toothed wheel (125) referred to as a "toothed guide wheel", freewheelingly mounted relative to the bracket (115), driven in rotation by the chain (115) around a first axis (130) parallel to the axes of rotation (110) of the crown gear and pinion (105);

a bracket (115) for securing to the frame (305), which comprises a means (165) for adjusting the position of the first axis (130) configured so that the position of the first axis (130) such that the tip circle of the first toothed wheel is tangential to the tip circle of the pinion.

10 Claims, 6 Drawing Sheets

(56) References Cited

U.S. PATENT DOCUMENTS

| | | | | |
|---|---|---|---|---|
| 7,955,205 | B2 * | 6/2011 | Urabe | B62M 9/16 474/80 |
| 8,267,820 | B2 * | 9/2012 | Yamamoto | B62M 9/16 474/133 |
| 8,371,974 | B2 * | 2/2013 | Morita | B62M 9/16 474/136 |
| 9,187,148 | B2 * | 11/2015 | Jewell | F16H 7/06 |
| 9,376,163 | B2 * | 6/2016 | Arimune | B62J 45/411 |
| 9,963,198 | B2 * | 5/2018 | Scolari | B62M 9/12 |
| 10,220,913 | B2 * | 3/2019 | Kitamura | B62M 9/121 |
| 10,486,770 | B2 * | 11/2019 | Emura | B62M 9/16 |
| 11,131,367 | B2 * | 9/2021 | Wu | F16H 7/12 |
| 11,492,060 | B2 * | 11/2022 | Carlier | F16H 7/18 |
| 12,103,641 | B2 * | 10/2024 | Rodriguez | B62K 19/30 |
| 2003/0224891 | A1 * | 12/2003 | Chou | B62M 9/16 474/146 |
| 2004/0009835 | A1 * | 1/2004 | Heim | B62M 9/138 474/199 |
| 2005/0176538 | A1 * | 8/2005 | Morita | B62M 9/16 474/136 |
| 2006/0240920 | A1 * | 10/2006 | Urabe | B62M 9/16 474/80 |
| 2010/0113200 | A1 * | 5/2010 | Yamamoto | B62M 9/16 474/133 |
| 2010/0194182 | A1 * | 8/2010 | Katz | B62M 9/16 474/134 |
| 2012/0142469 | A1 * | 6/2012 | Barefoot | B62J 23/00 474/139 |
| 2012/0322594 | A1 * | 12/2012 | Kitamura | B62M 9/122 474/110 |
| 2014/0135159 | A1 * | 5/2014 | Yang | B62M 9/085 474/148 |
| 2014/0166385 | A1 * | 6/2014 | Arimune | B62J 45/421 180/206.3 |
| 2014/0235388 | A1 * | 8/2014 | Chang | F16H 7/14 474/135 |
| 2014/0319798 | A1 * | 10/2014 | Jewell | F16H 7/06 280/260 |
| 2014/0357437 | A1 * | 12/2014 | Hara | B62M 9/16 474/113 |
| 2018/0001961 | A1 * | 1/2018 | Emura | B62K 25/30 |
| 2019/0170225 | A1 * | 6/2019 | Wu | B62M 9/16 |
| 2020/0047837 | A1 * | 2/2020 | Carlier | F16H 7/18 |
| 2022/0144381 | A1 * | 5/2022 | Rodriguez | B62K 19/30 |
| 2024/0300616 | A1 * | 9/2024 | Mueller | B62J 43/13 |
| 2024/0425141 | A1 * | 12/2024 | Mueller | B62J 43/13 |

FOREIGN PATENT DOCUMENTS

| | | | |
|---|---|---|---|
| EP | 2562074 | A1 | 2/2013 |
| JP | 2007125975 | A | 5/2007 |

* cited by examiner

[Fig 1]
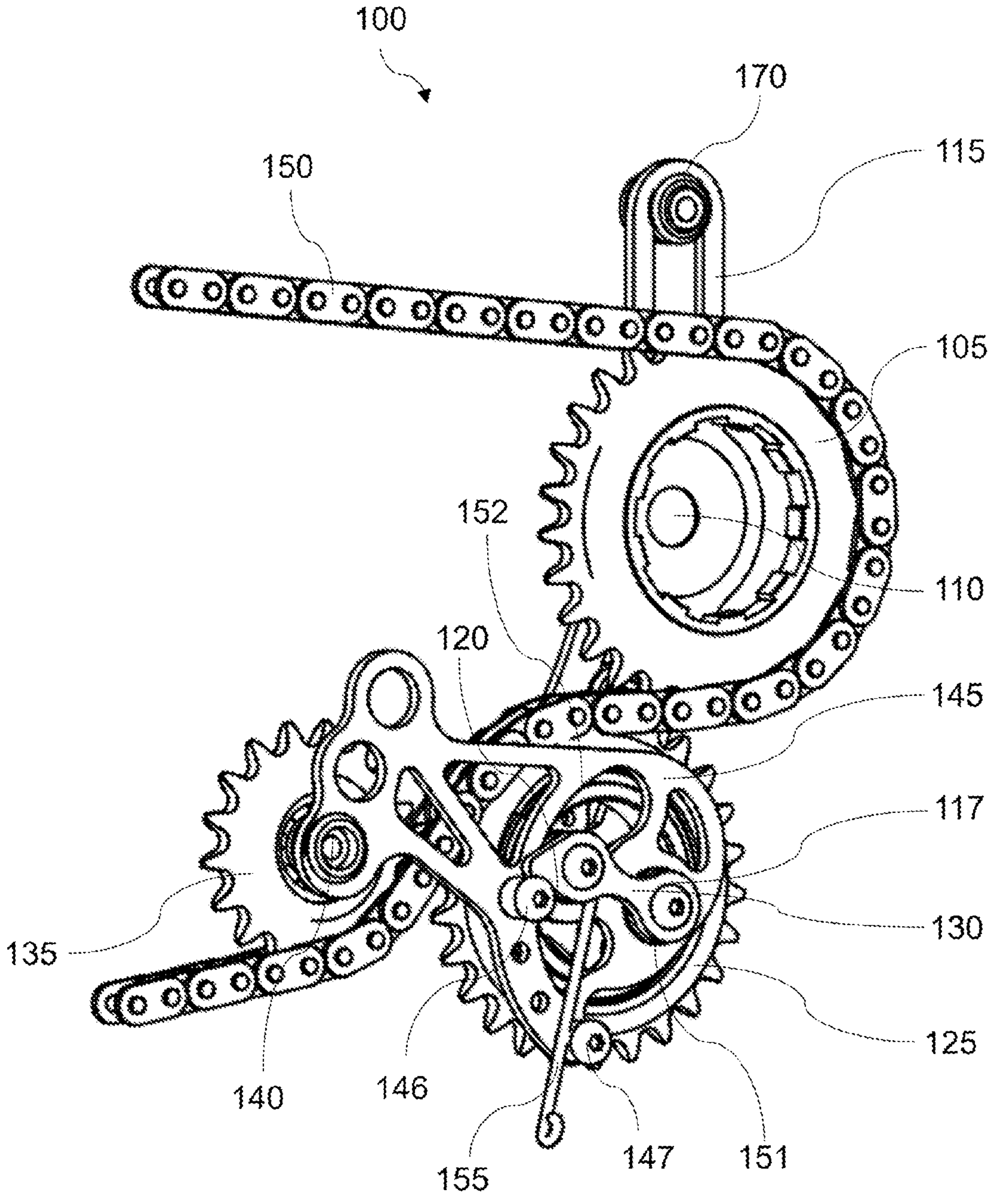

[Fig 2]
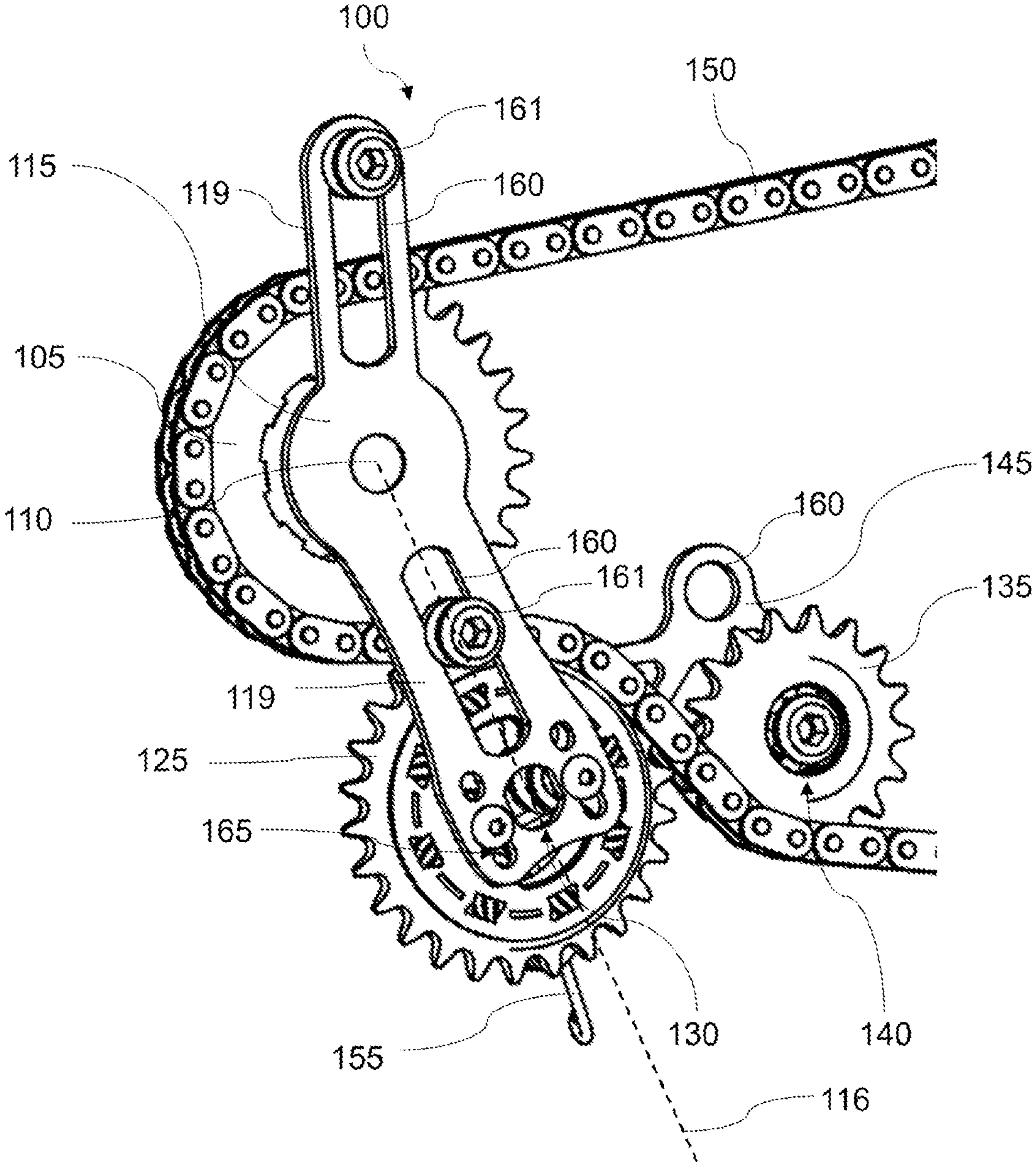

[Fig 3]
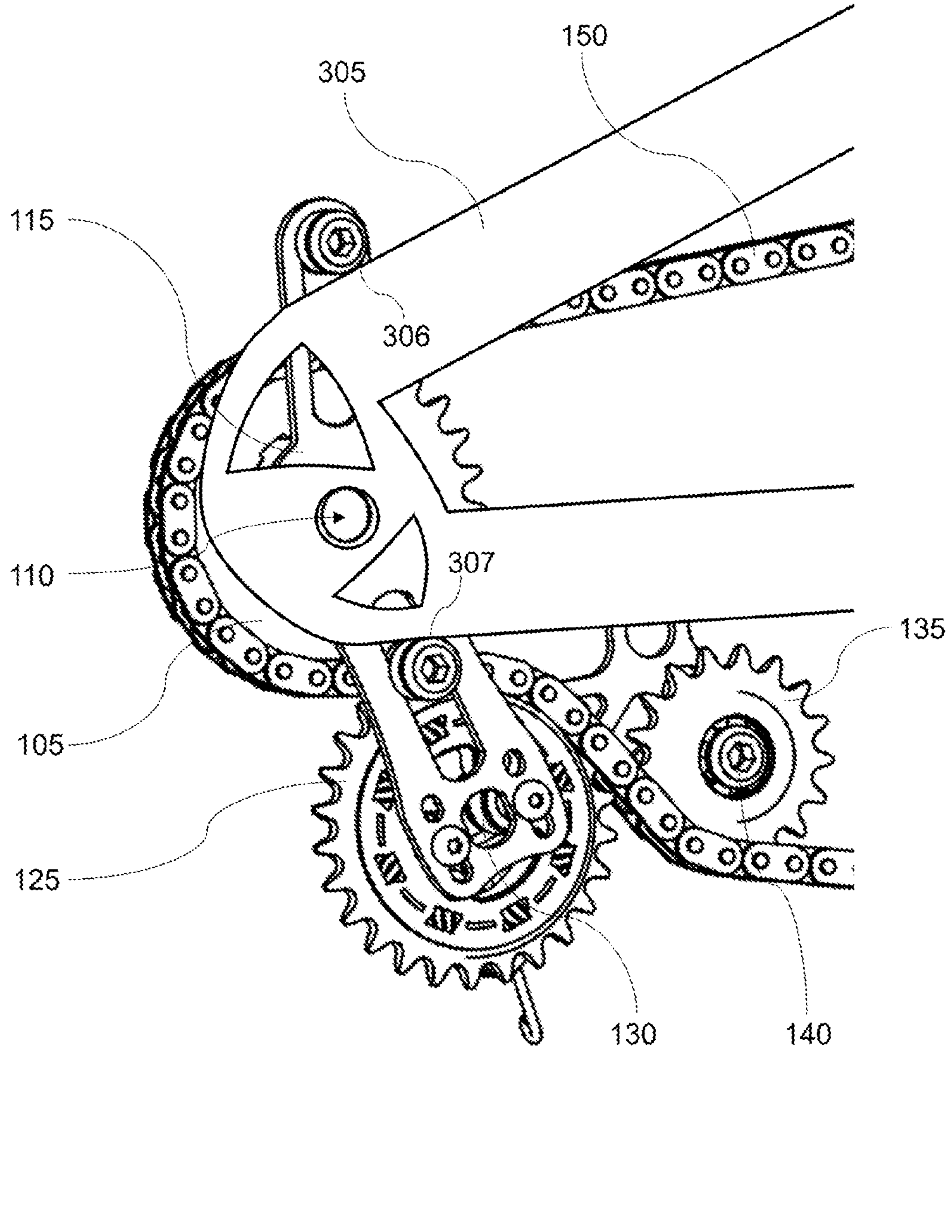

[Fig 4]
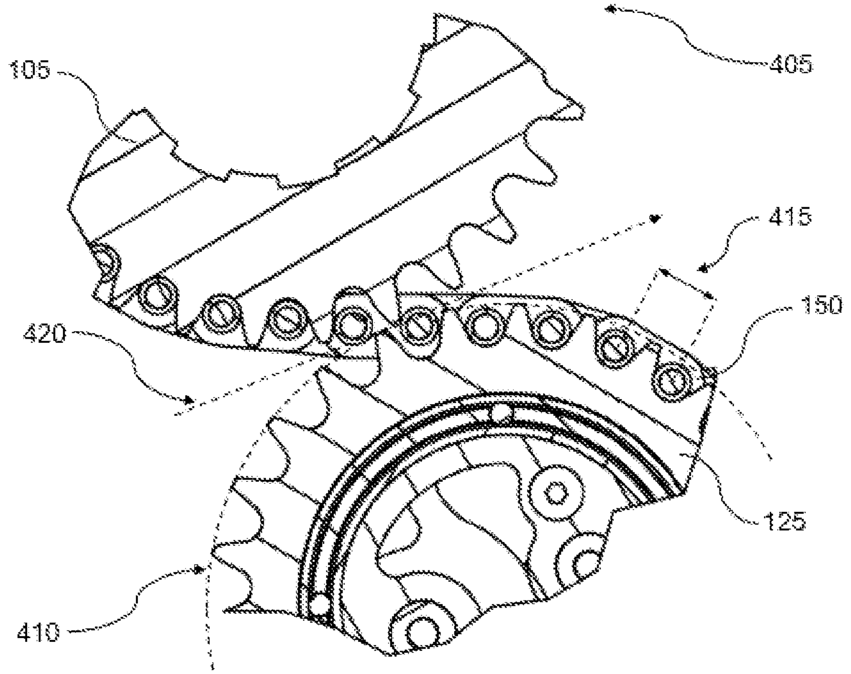

[Fig 5]
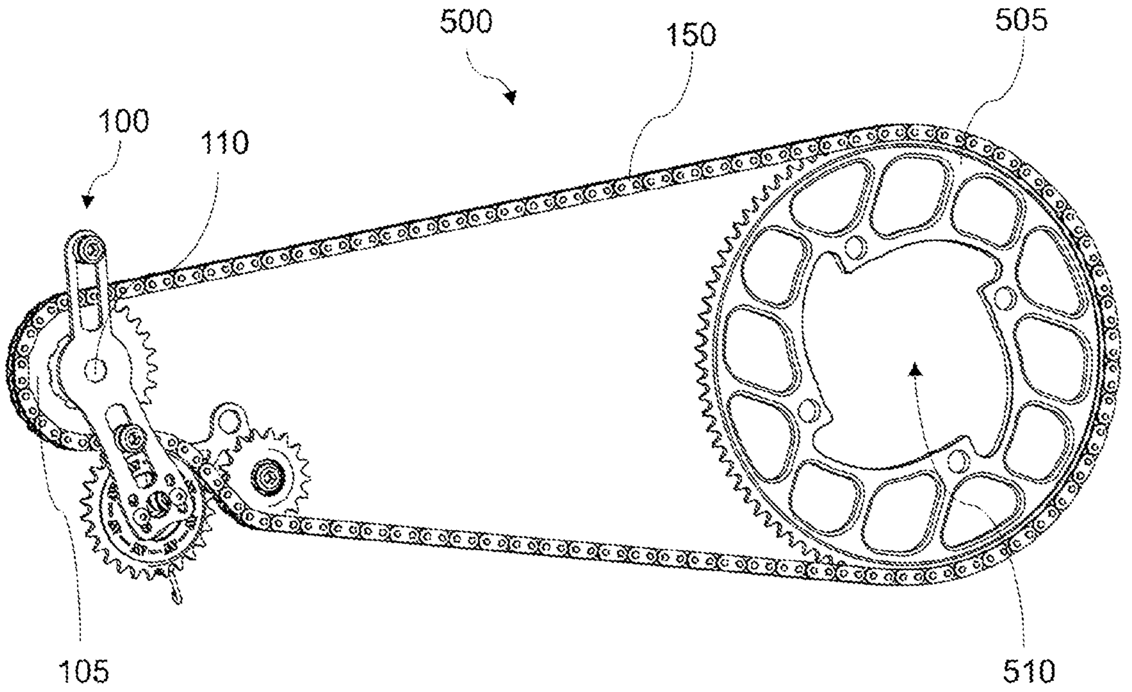
[Fig 6]
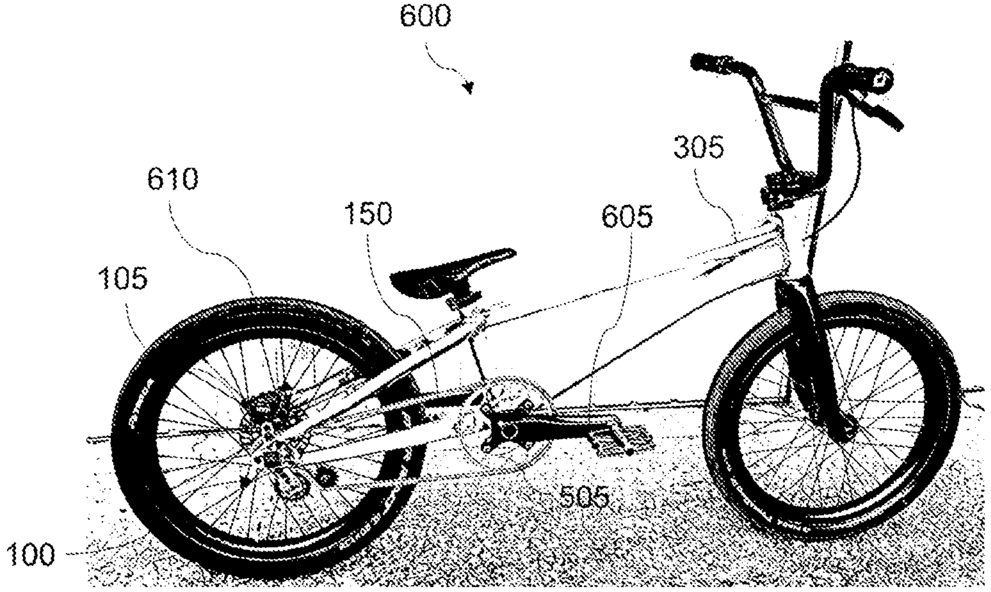

[Fig 7]
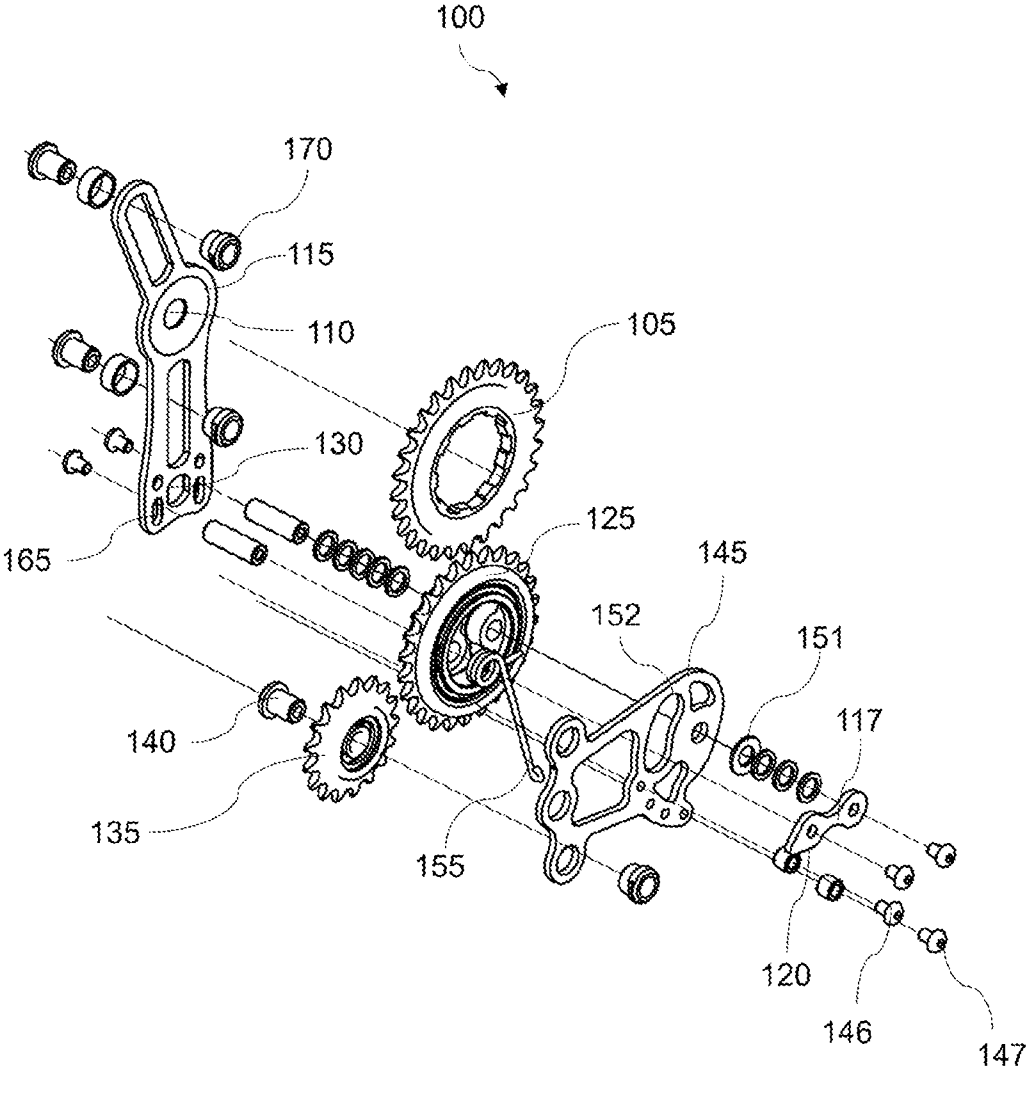

BICYCLE CHAIN TENSIONER, KIT AND BICYCLE INCLUDING SUCH A TENSIONER

TECHNICAL FIELD OF THE INVENTION

The present invention relates to a bicycle chain tensioner, a kit including such a tensioner, and a bicycle including such a kit. It applies, in particular, to the field of motorised or non-motorised two-wheeled vehicles, bicycles referred to as "cargo bicycles", or delivery tricycles. It applies, more specifically, to the field of extreme cycling sports.

STATE OF THE ART

The approaches described in this section are approaches that could be pursued, but not necessarily approaches that have been developed or pursued previously. Consequently, unless otherwise indicated, it must not be assumed that any of the approaches described in this section constitutes a prior art solely because of its inclusion in this section.

In the field of non-motorised two-wheeled vehicles, problems related to the wear of mechanical parts arise over time. In particular the mechanism of the toothed wheels and chain of a bicycle is affected by deteriorations linked to long-term use.

Notably, the bicycle chain gets longer, leading to the chain losing tension between the crown gear and the pinion. This loss of tension results in a loss of power transmission and therefore a lower speed for the same effort by the cyclist. The looser the chain, the lower the transmission ratio. This results in a reduction in the mechanical efficiency of the system. When starting, the user takes longer to get up to speed when he begins to pedal.

In the field of extreme sports, the bicycle chain's loss of tension resulting in a slower start makes the user lose time right at the beginning of the race.

Chain tensioners are known that are fixed on the frame close to the pinion and comprise a toothed wheel and a spring. The toothed wheel exerts pressure on the chain through the action of the spring to bring the chain against the pinion. The spring exerts a large force whose direction is opposite to the rotational direction of the chain. Such tensioners exert a large pressure force on the chain, which the user must counter when he starts to pedal. Therefore, the user must exert more force when starting, which increases his start-up time.

SUMMARY OF THE INVENTION

The general concept of the invention consists of utilising toothed wheels, in contact with a bicycle chain, providing a better tension to the chain. The pressure force is created by a pivoting freewheel system comprising a mechanical stop, thereby bringing the two toothed wheels of the tensioner closer. The constraining force on the chain is therefore reduced. In this way, the tensioner optimises the torque transmitted to the pinion while making it possible to obtain better mechanical efficiency.

In particular, in the extreme sports field, the chain tensioner of the present invention enables a gain in speed in the first metres of several seconds.

BRIEF DESCRIPTION OF THE FIGURES

Other advantages, aims and particular features of the invention will become apparent from the non-limiting description that follows of at least one particular embodiment of the bicycle chain tensioner, kit and bicycle that are the subjects of the present invention, with reference to drawings included in an appendix, wherein:

FIG. 1 represents, schematically and in a rear view, a particular embodiment of the bicycle chain tensioner that is the subject of the present invention;

FIG. 2 represents, schematically and in a front view, the bicycle chain tensioner, the subject of the present invention, illustrated in FIG. 1;

FIG. 3 represents, schematically and in a front view, a bicycle frame and the bicycle chain tensioner, the subject of the present invention, illustrated in FIG. 1;

FIG. 4 represents, schematically and in a partial cross-section view, a pinion, a chain and a bicycle chain tensioner, the subject of the present invention, illustrated in FIG. 1;

FIG. 5 represents, schematically and in perspective, an embodiment of the kit that is the subject of the present invention;

FIG. 6 represents, schematically and in perspective, an embodiment of the bicycle that is the subject of the present invention; and FIG. 7 represents, schematically and in an exploded view, the bicycle chain tensioner illustrated in FIG. 1.

DESCRIPTION OF THE EMBODIMENTS

The present description is given in a non-limiting way, in which each characteristic of an embodiment can be combined with any other characteristic of any other embodiment in an advantageous way.

Note that the figures are not to scale.

As can be seen from reading the present description, different inventive concepts can be implemented by one or more methods or devices described below, several examples of which are given here. The actions or steps performed in the framework of realising the method or device can be ordered in any appropriate way. As a consequence, it is possible to construct embodiments in which the actions or steps are performed in a different order from the one shown, which can include executing some acts simultaneously, even if they are presented as sequential acts in the embodiments shown.

The indefinite articles "one" or "a", as used in the description and in the claims, must be understood as meaning "at least one", except when the contrary is clearly indicated. The expression "and/or", as it is used in the present document and in the claims, must be understood as meaning "one or other, or both" of the elements thus connected, i.e. elements that are present conjunctively in some cases and disjunctively in other cases. The multiple elements listed with "and/or" must be interpreted in the same way, i.e. "one or more" of the elements thus connected. Other elements can possibly be present, other than the elements specifically identified by the clause "and/or", whether or not they are linked to these specifically identified elements. Therefore, as a non-limiting example, a reference to "A and/or B", when it is used in conjunction with open-ended language such as "comprising", can refer, in one embodiment, to A only (possibly including elements other than B); in another embodiment, to B only (possibly including elements other than A); in yet another embodiment, to A and B (possibly including other elements); etc.

As used in the present description and in the claims, "or" must be understood inclusively.

As used here in the present description and in the claims, the expression "at least one", in reference to a list of one or more elements, must be understood as meaning at least one element chosen from among one or more elements in the list of elements, but not necessarily including at least one of each element specifically listed in the list of elements and not excluding any combination of elements in the list of elements. This definition also allows the optional presence of elements other than the elements specifically identified in the list of elements to which the expression "at least one" refers, whether or not they are linked to these specifically identified elements. Therefore, as a non-limiting example, "at least one of A and B" (or, equivalently, "at least one of A or B" or, equivalently, "at least one of A and/or B"), can refer, in one embodiment, to at least one, possibly including more than one, A, with no B present (and possibly including elements other than B); in another embodiment, to at least one, possibly including more than one, B, with no A present (and possibly including elements other than A); in yet another embodiment, to at least one, possibly including more than one, A and at least one, possibly including more than one, B (and possibly including other elements); etc.

In the claims, and also in the description below, all the transitive expressions such as "comprising", "including", "bearing", "having", "containing", "involving", "made of", "formed of" and others, must be understood as being open, i.e. meaning including, but not limited to. Only the transitive expressions "consisting of" and "consisting essentially of" must be understood as closed or semi-closed transitional expressions, respectively. Throughout the description, the terms "upper" and "top" refer to being located at the top when the tensioner is installed on a bicycle. The terms "bottom" and "lower" refer to being located at the bottom when the tensioner is installed on a bicycle. The term "vertical" refers to being parallel to the direction of gravity when the tensioner is installed on a bicycle. The term "horizontal" refers to being perpendicular to the direction of gravity when the tensioner is installed on a bicycle.

The term "bicycle" refers to any device equipped with a crankset, defined as follows: a locomotion device equipped with wheels and driven by the action of feet on pedals (cycle, tandem, tricycle, bike, cargo bike, pedal bike, push bike, etc.).

FIGS. 1, 2, 5, 6 and 7, which are to scale but are at different scales, show a schematic view of an embodiment of the bicycle chain tensioner 10 that is the subject of the present invention. The bicycle 600 comprises a frame 305 having a crown gear 505 fixed to a crankset 605 and a pinion 105 fixed to a wheel 610, the crown gear 505 and the pinion 105 having axes of rotation 110, 510 and 515 parallel relative to the frame 305, the chain 150 transmitting the rotational force exerted on the crown gear 505 by means of the crankset 605 to the pinion 105. The tensioner 100 comprises:

- a first toothed wheel 125 referred to as a "toothed guide wheel", freewheelingly mounted relative to a bracket 115, driven in rotation by the chain 150 around a first axis 130 parallel to the axes of rotation 110, 510 and 515 of the crown gear 505 and pinion 105;
- the bracket 115 for attaching to the frame 305, which comprises a means 165 for adjusting the position of the first axis 130 configured so that the position of the first axis 130 is such that the tip circle of the first toothed wheel 410 is tangential to the tip circle of the pinion 405.

In some embodiments, the bracket 115 for attaching to the frame comprises a stop 120, and the tensioner 100 also comprises:

- a second toothed wheel 135 referred to as a "tensioning wheel", driven in rotation by the chain 150 around a second axis 140 parallel to the first axis 130;
- a framework 145 of the second toothed wheel 135, the second toothed wheel 135 being freewheelingly mounted relative to the framework 145, the framework 145 forming a pivot link with the bracket 115 having an axis parallel to or coincident with the first axis 130, the rotation of the framework 145, under the effect of a force exerted by the chain 150 on the tensioning wheel 135 relative to the bracket 115 being limited by the stop 120.

The attachment bracket 115 can be a solid of any shape whatsoever suitable for attaching on a bicycle frame 305. Preferably, the bracket 115 has two axes connected by an angle less than 180°, the angle corresponding to the position of the axis of rotation 110 of the pinion 105. Preferably, the bracket 115 is fixed to the bicycle frame 305 independently of the pinion. In other words, the bracket 115 is fixed whereas the pinion 105 has a pivot link with the frame 305 along the axis 110.

Preferably, the bracket 115 comprises two arms, 118 and 119, extending along the axes.

In some embodiments, the dimension of each arm, 118 and 119, is different so as to adapt to the bicycle frame 305. The dimensions of the bracket 115 are preferably selected to adapt to the dimensions of the frame 305. For example, the length of the bracket 115 is greater than the length of the frame 305 along a vertical axis from the centre of the axis 110 of the pinion 105.

For example, the bracket 115 comprises a through aperture enabling the bracket 115 to be placed on the axis 110 of the pinion 105. The bracket 115 can comprise a means for attachment on the axis 110. Such an attachment means can be any type known to the person skilled in the art, for example a nut-and-bolt type.

In some embodiments, the bracket 115 comprises, on at least one arm, 118 and 119, means for adjusting to any shape of bicycle frame 305. Such adjustment means can comprise, for example, at least one pin 161 configured to be placed in contact with the bicycle frame, the bracket being held in place by the attachment means, firstly, and each pin, secondly.

Preferably, the bracket comprises oblong holes and/or openings 160 corresponding to different positions of each pin 161.

The bracket 115 can have two oblong holes, preferably positioned above and below the axis of rotation 110 of the pinion 105 according to the axes defining each arm, 118 and 119. For example, the oblong holes form guide channels for sliders, such as the pins 161, having a sliding link in the oblong holes 160. The sliders 161 can have a tightening means 170 to block the translation of the slider 161 in the channel 160. For example, such tightening means 170 are nut-and-bolt systems or grippers.

In other embodiments, the tensioner 100 can be welded directly onto the bicycle frame 305, the attachment of the bracket 115 then being formed by the weld between the two elements.

The attachment bracket 115 can be comprised of a rigid material such as a carbon fibre reinforced material, a composite material or a metal alloy, for example steel, stainless steel or aluminium.

The attachment bracket 115 is a machined or moulded part, preferably with a thickness less than 5 cm, more preferably less than 2 cm and, even more preferably less than 1 cm. The thickness of the part corresponds to the largest dimension of the part along the axis of rotation of the pinion 105, when the device 100 and the pinion 105 are fixed to the frame.

Preferably, the end of an arm 119 of the attachment bracket comprises a stop 117. In the embodiments shown, the stop 117 preferably has a shape comprising two circular ends joined by a curved connection surface. The stop 117 comprises a flat portion 120 configured to enter into contact with the framework and limit its rotation.

The attachment bracket 115 and the stop 117 can be formed of a single part. Preferably, the stop 117 is a part separate from the bracket 115, attached by attachment means that can be of any type generally used. Preferably, the attachment means comprises at least one, preferably two, oblong 165 or circular apertures, the stop being fixed by a bolt in each aperture.

The stop 117 protrudes relative to the attachment bracket 115.

Preferably, the stop 117 is preferably fixed to an inner ring of a bearing, the outer ring of this bearing being mounted on the first toothed wheel 125. In these embodiments, the inner ring of the bearing is fixed to the stop 117, and to the attachment bracket 115 by the attachment means. For example, a bolt can pass successively through the stop 117, the inner ring of the bearing and the attachment bracket.

The first toothed wheel 125 is of any type generally used in the field of bicycle mechanics. The first toothed wheel 125 is freewheelingly fixed, by means of the bearing, relative to the attachment bracket along an axis parallel to the axis of rotation of the pinion 105 when the device 100 is mounted on a bicycle frame 305. Preferably, the first toothed wheel 125 is positioned on the same side of the attachment bracket 115 as the pinion 105. In other words, the mid-surface of the first toothed wheel 125 is coplanar with the mid-surface of the pinion 105.

The first toothed wheel 125 rotates around a first axis 130 parallel to the axes of rotation, 510 and 110, of the crown gear 505 and pinion 105. The first toothed wheel 125 is configured such that the tip circle 410 of the first toothed wheel 125 is tangential to the tip circle 405 of the pinion 105.

The attachment bracket comprises a means 165 for adjusting the position of the first axis 130 configured such that the tip circle 410 of the first toothed wheel 125 is tangential to the tip circle 405 of the pinion 105. In other words, the first axis 130 is positioned such that a point of contact between the tip circle 410 of the first toothed wheel 110 and the tip circle 405 of the pinion 105 is the point of the common tangent 420 to these two circles.

In the embodiments in which the inner ring of the bearing is fixed to the stop 117, the attachment means 165 correspond to the adjustment means, the position of the axis of the bolt being adjustable in the oblong hole, thereby forming a sliding or sliding pivot link along the axis of the arm 119 of the attachment bracket to which the assembly is fixed.

In some embodiments, such as those shown in FIGS. 2 and 4, the adjustment means 165 can be a slider or a series of at least two separate apertures.

In some embodiments (not shown), the adjustment means 165 is comprised of two series of at least two apertures. Preferably, the attachment bracket 115 can consist of two series of three separate apertures, these series being symmetrical relative to an axis 116. The first axis 130 can comprise an attachment means to keep the first axis 130 in position in the aperture in which it is placed, i.e. to keep the first toothed wheel 125 in position. Such an attachment means can be any type generally used in the field of bicycle mechanics, for example a nut-and-bolt type.

When the device is fixed to the frame 305 of a bicycle, the first axis 130 of the first toothed wheel 125 is positioned below the axis 110 of the pinion 105. In other words, the positioning of the first toothed wheel 125 guides the chain 150 so that the chain 150 is in contact with the teeth of the pinion 105. In other words, the first toothed wheel 125 is preferably positioned to guide the chain 150 towards the pinion 105. It is noted here that the teeth of the first toothed wheel 125 are adapted to the pitch of the chain 150. The teeth of the first toothed wheel 125 engage with the chain but not with the pinion 105.

The configuration presented above makes it possible to increase the efficiency of the transmission of power between the chain 150 and the pinion 105. In effect, more chain links engage with the pinion 105.

The rotational movement of the first toothed wheel 125 is transmitted via the chain 150. The first toothed wheel 125 can be positioned inside or outside the chain 150. Preferably, the first toothed wheel 125 is positioned outside the chain 150. In other words, the first toothed wheel 125 turns in a direction opposite to the rotational direction of the pinion 105 and the crown gear 505.

The framework 145 is configured to position the second toothed wheel 135 on the other side of the chain 150 relative to the first toothed wheel 125. The framework 145 is a solid comprising two means for forming parallel axes of rotation: one axis of rotation with the attachment bracket 115, firstly, and one axis of rotation of the second toothed wheel 135, secondly. The centre distance between these axes of rotation is greater than or equal to the sum of the radius of the tip circle of the first toothed wheel 125 and the radius of the tip circle of the second toothed wheel 135.

The framework 145 is fixed to the attachment bracket 115 by a pivot link along a third axis. The third axis is parallel to the first and second axes, 130 and 140.

The framework 145 comprises, firstly, a shape referred to as "rotation" 148 relative to the bracket 115 and, secondly, a shape referred to as "attachment" 149 of the second toothed wheel 135. The rotation shape 148 has, for example, a disk shape pierced with two separate openings. A first opening 151 can be a through-hole forming the pivot link with the bracket 115 on the third axis, parallel to or coincident with the first axis 130. In other words, the first opening 151 can be coaxial to the first axis 130. Preferably, the first opening 151 forms a pivot link between the framework 145 and a means for attaching the stop 117 to the bracket 115. Preferably, the attachment means forming the pivot link is the means for attaching the stop 117 to the bracket 115 farthest from the flat portion 120.

A second opening 152 can be an oblong hole forming a circular arc. For example, this second opening 152 makes it possible to rotate the bracket 115 while allowing the rotational movement of the means for attaching the stop 117 to the bracket 115.

In some variants (not shown), according to which the stop part 117 has a single means for attaching to the bracket 115, the rotation shape 148 has a disk shape pierced with a single opening. This single opening can be a through-hole forming the pivot link with the bracket 115 having an axis parallel to or coincident with the first axis 130. In other words, the single opening can be coaxial to the first axis 130. Preferably, the single opening forms a pivot link between the framework 145 and the means for attaching the stop part 117 to the bracket 115.

The second toothed wheel 135 is parametrised based on the chain used. The inner surface of the second toothed wheel 135 can be mounted on a bearing whose inner ring is fixed to the framework 145. The bearing allows the second toothed wheel 135 to be in free rotation around the second axis 140. In other words, the second toothed wheel 135 rotates freely relative to the framework 145.

Preferably, the second toothed wheel 135 has a smaller diameter than the first toothed wheel 125. The mid-surface of the second toothed wheel 135 can be coplanar with the mid-surface of the pinion 105. In other words, the mid-surface of the second toothed wheel 135 is coplanar with the mid-surface of the first toothed wheel 125. These embodiments make it possible to avoid having the chain come off.

The rotational movement of the second toothed wheel 135 is transmitted via the chain 150. The second toothed wheel 135 is positioned inside the chain 150. In other words, the second toothed wheel 135 turns in a direction identical to the rotational direction of the pinion 105 and the crown gear 505.

The second toothed wheel 135 is subjected to a mechanical force via the chain 150, causing a rotation of the framework 145 around the third axis 130 in a clockwise direction as per the view in FIG. 1.

The rotation of the framework 145 relative to the bracket 115 is limited by the flat portion 120 of the stop 117. The framework 145 can comprise a spur or a projection 146 that can be of any shape. In some embodiments, the projection 146 is a mechanical part attached to the framework 145. For example, such a mechanical part is a spur or a ring. The mechanical part is fixed by an attachment means such as a nut-and-bolt system.

The projection 146 of the framework 145 comes into contact with the flat portion 120 of the stop 117 of the bracket 115, thus limiting the rotation of the framework 145.

The framework 145 can have slots, through or not, limiting the amount of material used to form the framework without affecting the capacities of resistance to the mechanical forces driven by the force exerted at the contact with the stop 117, firstly, and at the second axis 140, secondly.

Preferably, the framework 115 can be comprised of a rigid material such as carbon, a composite material or a metal alloy, for example steel, stainless steel or an aluminium alloy.

The framework 145 is a machined or moulded part, preferably with a thickness less than 5 cm, more preferably less than 2 cm and, even more preferably less than 1 cm. The thickness of the part corresponds to the largest dimension of the part along the axis of rotation of the pinion 105, when the device 100 and the pinion 105 are fixed to the frame.

In some embodiments, such as that shown in FIG. 1, the tensioner 100 comprises a compensating spring 155 configured to keep the framework 145, and more specifically the projection 146, in contact with the stop 120.

The spring 155 is a rotating spring fixed between a point of the framework 145. The spring 155 is configured to position the projection 146 farther from the flat portion 120 of the stop 117. The spring 155 can be positioned around the third axis 130. The spring 155 can be placed between the stop 120 and the framework 145. In other words, the spring 155 is positioned on the means for attaching the stop 117 to the bracket 115. Preferably, the spring 155 is rolled on the two means for attaching the stop 117 to the bracket 115.

The spring 155 can comprise a rigid rod exerting a force on the second projection 147 on the framework 145. In other words, the surface of the framework 145 comprises a second projection 147 that can be of any shape. The second projection 147 can be a mechanical part attached to the framework 145. For example, such a mechanical part is a spur or a ring. The mechanical part is fixed by an attachment means that can be a nut-and-bolt system. The second projection 147 is fixed on the same surface of the framework as the first projection 146.

In some variants (not shown), the bracket 115 can be formed of two parts having a sliding link relative to each other, thus forming a telescopic bracket 115. Preferably, the bracket 115 has tightening means 170, such as a nut-and-bolt system, on the ends of the two parts to keep the bracket 115 in position on the frame 305.

In some embodiments, such as that shown in FIG. 1, the framework 145 comprises at least one means 160 for adjusting the position of the second axis 140. The adjustment means 160 can be similar to those described above.

In some variants (not shown), such an adjustment means 160 can be a sliding link between the second axis 140, on which the second toothed wheel 135 is mounted, and the framework 145. The framework 145 has, for example, an oblong hole whose sizing is suitable for the passage of the second axis 140.

In some embodiments (not shown), at least one adjustment means 160 comprises a slider moving in a channel, the slider comprising means 170 for tightening on the channel.

The bracket 115 can have oblong holes, forming channels, preferably positioned above and below the axis of rotation of the pinion 105. Sliders, moving in these channels, can provide bracket on each outer side of the frame 305, close to the axis of rotation of the pinion 105. These two brackets create, for example, two special links 306 between the sliders and the frame 305. In some variants (not shown), the sliders can provide support on each inner side of the frame 305.

The sliders can have a tightening means 170 to block the translation. For example, such tightening means 170 are nut-and-bolt systems or grippers.

In some embodiments, such as those shown in FIGS. 1 and 2, at least one adjustment means 160 comprises at least two separate apertures defining attachment positions for the frame 305 of the bicycle or second axis 140.

Such an adjustment means 160 can be a series of at least two separate apertures whose dimensions are adapted to the dimensions of a bearing forming the second axis 140. Preferably, the framework 145 has 3 apertures. For example, the centres of the apertures can be placed on a path tracing a circle whose centre is the third axis 130.

FIG. 5, shows, schematically, a particular embodiment of a kit 500 for a bicycle comprising a tensioner 100 and at least one element from among a pinion 105, a crown gear 505 and/or a chain 150.

In some embodiments, such as that shown in FIG. 4, the chain 150 has a pitch 415 between 5.5 mm and 8.5 mm, preferably between 6 mm and 7.99 mm.

For example, the first toothed wheel 125 and the second toothed wheel 135 have characteristics suitable for a chain 150 with a pitch 415 between 5.5 mm and 8.5 mm. Preferably, the first toothed wheel 125 and the second toothed wheel 135 have characteristics suitable for a chain 150 with a pitch 415 between 6 mm and 7.99 mm, preferably between 6 mm and 7 mm and, even more preferably, 6 mm.

FIG. 6 shows, schematically, a particular embodiment of a bicycle 600 comprising a tensioner 100. The bicycle 600 comprises a frame 305 having a crown gear 505 fixed to a crankset 605 and a pinion 105 fixed to a wheel 610, the crown gear 505 and the pinion 105 having axes of rotation parallel relative to the frame 305, the chain 150 transmitting the rotational force exerted on the crown gear 505 by means of the crankset 605, a tensioner 100 as described above is fixed to the frame 305 around the pinion 105.

The bicycle also comprises a front wheel mounted on a handlebar and a saddle in ways known to the person skilled in the art.

Preferably, the bicycle is a "BMX" (acronym for "Bicycle Motocross") type.

When the user actuates the crankset 605, the chain 150 drives in rotation, without transmission of power, the first and second toothed wheels, 125 and 135. The power is transmitted at the location of the pinion 105 which enables the bicycle 600 to be propelled by means of the wheel 610. Given the position of the chain between the second toothed wheel 135 and the first toothed wheel 125, the chain exerts an upward force on the second toothed wheel 135. This force drives the framework 145 in rotation towards the stop. The resistance of the stop makes it possible to exert the chain tensioning force.

Presentation of the Invention

The present invention aims to remedy all or part of these drawbacks.

To this end, according to a first aspect, the present invention envisages a bicycle chain tensioner, the bicycle comprising a frame having a crown gear fixed to a crankset and a pinion fixed to a wheel, the crown gear and the pinion having axes of rotation parallel relative to the frame, the chain transmitting the rotational force exerted on the crown gear by means of the crankset to the pinion. The tensioner comprises:

- a first toothed wheel referred to as a "toothed guide wheel", freewheelingly mounted relative to the bracket, driven in rotation by the chain around a first axis parallel to the axes of rotation of the crown gear and pinion;
- a bracket for attaching to the frame, which comprises a means for adjusting the position of the first axis configured so that the position of the first axis is such that the tip circle of the first toothed wheel is tangential to the tip circle of the pinion.

Thanks to these provisions, it is possible to easily adjust the position of the first toothed wheel of the tensioner relative to the pinion of the bicycle. The user can change the position of the first axis relative to the bracket. In this way, the tensioner can be adjusted to any pinion diameter. In addition, the number of points of contact between the chain and the pinion is increased, which enables a better transmission of power. Lastly, this position allows a constant and complete engagement of the pinion with the chain.

In some embodiments, the bracket for attaching to the frame comprises a stop, and the tensioner that is the subject of the present invention also comprises:

- a second toothed wheel referred to as a "tensioning wheel", driven in rotation by the chain around a second axis parallel to the first axis;
- a framework of the second toothed wheel, the second toothed wheel being freewheelingly mounted relative to the framework, the framework forming a pivot link with the bracket having an axis parallel to or coincident with the first axis, the rotation of the framework, under the effect of a force exerted by the chain on the tensioning wheel relative to the bracket being limited by the stop.

Such a tensioner enables the chain to be tensioned without creating a constraining force when the user starts to pedal. In effect, when starting and during pedalling, the user's action on the crankset drives the crown gear, chain and pinion in rotation. The first toothed wheel and the second toothed wheel are also rotating, driven by the chain. The second toothed wheel then drives the framework in rotation until blocked by the stop of the bracket, which remains fixed. Once the framework is blocked in rotation, the second toothed wheel creates a pressure force on the chain allowing it to be kept tensioned when the bicycle is used by minimising the forces on the chain. In addition, whatever the type of chain used, the present invention makes it possible to keep a chain tensioned, by taking up the existing play to effect the junction between the links of a chain.

In some embodiments, the tensioner comprises a compensating spring configured to keep the framework in contact with the stop.

These embodiments make it possible to minimise the effect of the play created during the wearing of the chain. In effect, the spring is mounted, thereby making it possible to compensate for any loss of tension due to play.

In some embodiments, the framework comprises at least one means for adjusting the position of the second axis.

These embodiments make it possible to adjust the position of the second toothed wheel so as to be adaptable to any chain length.

In some embodiments, the bracket comprises at least one means for adjusting the position for attachment to the bicycle frame.

These embodiments allow the chain tensioner to be adaptable to any bicycle frame shape and to adjust the position of the tensioner.

In some embodiments, at least one adjustment means comprises a slider moving in a channel, the slider comprising means for tightening on the channel.

These embodiments make it possible to easily adjust the position of a first part of the tensioner relative to a second part of the tensioner or of the bicycle. In effect, the user moves the first part, linked to the slider, in a channel, linked to the second part, to a desired position. Next, the user fixes this position via the tightening means on the slider relative to the channel.

In some embodiments, at least one adjustment means comprises at least two separate apertures defining attachment positions for the frame of the bicycle or second axis.

These embodiments make it possible to easily adjust the position of a first part of the tensioner relative to a second part of the tensioner or of the bicycle. In particular, the user places the first axis in one of the apertures on the bracket, thereby making it possible to adjust the position of the first toothed wheel, whose rotational centre is the first axis.

According to a second aspect, the present invention envisions a kit for a bicycle comprising a tensioner and at least one element from among a pinion, a crown gear and/or a chain.

As the particular features, advantages and aims of the kit that is the subject of the present invention are identical to those of the tensioner that is the subject of the present invention, they are not repeated here.

In some embodiments, the chain has a pitch between 5.5 mm and 8.5 mm, preferably between 6 mm and 7.99 mm.

The inventors have noted that such a chain enables a better transmission of power for a similar effort. Therefore, the user can go faster for the same effort.

According to a third aspect, the present invention envisions a bicycle comprising a tensioner.

As the particular features, advantages and aims of the bicycle that is the subject of the present invention are identical to those of the tensioner and kit that are the subjects of the present invention, they are not repeated here.

The invention claimed is:

1. Bicycle chain tensioner (100), the bicycle (600) comprising a frame (305) having a crown gear (505) fixed to a crankset (605) and a pinion (105) fixed to a wheel (610), the crown gear (505) and the pinion (105) having axes of rotation (110, 510, 515) parallel relative to the frame (305), the chain (150) transmitting the rotational force exerted on the crown gear (505) by means of the crankset (605) to the pinion (105), the tensioner (100) being characterised in that it comprises:

a first toothed wheel (125), referred to as a "toothed guide wheel", freewheelingly mounted relative to a bracket (115), driven in rotation by the chain (115) around a first axis (130) parallel to the axes of rotation (110, 510, 515) of the crown gear (505) and pinion (105);

a bracket (115) for attaching to the frame (305), which comprises a means (165) for adjusting the position of the first axis (130) configured so that the position of the first axis (130) is such that the tip circle of the first toothed wheel (410) is tangential to the tip circle of the pinion (405).

2. Tensioner according to claim 1, wherein the bracket (115) for attaching to the frame comprises a stop (120), the tensioner also comprising:

a second toothed wheel (135), referred to as a "tensioning wheel", driven in rotation by the chain (150) around a second axis (140) parallel to the first axis (130);

a framework (145) of the second toothed wheel (135), the second toothed wheel (135) being freewheelingly mounted relative to the framework (145), the framework (145) forming a pivot link with the bracket (115) having an axis parallel to or coincident with the first axis (130), the rotation of the framework (145), under the effect of a force exerted by the chain (150) on the tensioning wheel (135) relative to the bracket (115) being limited by the stop (120).

3. Tensioner according to claim 2, which also comprises a compensating spring (155) configured to keep the framework (145) in contact with the stop (120).

4. Tensioner according to claim 2, wherein the framework (145) comprises at least one means (160) for adjusting the position of the second axis (140).

5. Tensioner according to claim 1, wherein the bracket (115) comprises at least one means (160) for adjusting the position for attachment to the bicycle frame (305).

6. Tensioner (100) according to claim 4, wherein at least one adjustment means (160) comprises a slider moving in a channel, the slider comprising means (170) for tightening on the channel.

7. Tensioner (100) according to claim 4, wherein at least one adjustment means (160) comprises at least two separate apertures defining attachment positions for the frame (305) of the bicycle or second axis (140).

8. Kit (500) for a bicycle comprising a tensioner (100) according to claim 1, and at least one element from among a pinion (105), a crown gear (505) and/or a chain (150).

9. Kit (500) according to claim 8, wherein the chain (150) has a pitch (415) between 5.5 mm and 8.5 mm, preferably between 6 mm and 7.99 mm.

10. Bicycle (600) which comprises a tensioner (100) according to claim 1.

* * * * *